United States Patent
Sumter et al.

(10) Patent No.: US 10,289,205 B1
(45) Date of Patent: May 14, 2019

(54) BEHIND THE EAR GESTURE CONTROL FOR A HEAD MOUNTABLE DEVICE

(71) Applicant: Google LLC, Mountain View, CA (US)

(72) Inventors: Cody Sumter, Palo Alto, CA (US); Angela Guzman Suarez, San Jose, CA (US); Maj Isabelle Olsson, Sunnyvale, CA (US); Matthew Tait, Mountain View, CA (US); Alok Chandel, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 14/951,306

(22) Filed: Nov. 24, 2015

(51) Int. Cl.
| | | |
|---|---|---|
| *G06F 3/01* | (2006.01) | |
| *G06F 3/16* | (2006.01) | |
| *G02B 27/01* | (2006.01) | |
| *G06F 3/041* | (2006.01) | |

(52) U.S. Cl.
CPC ......... *G06F 3/017* (2013.01); *G02B 27/0172* (2013.01); *G06F 3/041* (2013.01); *G06F 3/167* (2013.01); *G02B 27/017* (2013.01)

(58) Field of Classification Search
CPC .......... G06F 3/017; G06F 3/041; G06F 3/167; G02B 27/0172; G02B 27/017; G02B 23/125
See application file for complete search history.

(56) References Cited

U.S. PATENT DOCUMENTS

| | | | |
|---|---|---|---|
| 8,203,502 B1* | 6/2012 | Chi | G02B 27/017 345/7 |
| 8,665,177 B2 | 3/2014 | Herrmann et al. | |
| 9,024,845 B2 | 5/2015 | Kim et al. | |
| 9,081,810 B1 | 7/2015 | Smith | |
| 2002/0039427 A1 | 4/2002 | Whitwell et al. | |
| 2005/0238190 A1* | 10/2005 | Rohrlein | H03G 3/04 381/312 |
| 2006/0252470 A1* | 11/2006 | Seshadri | H04M 1/05 455/575.2 |
| 2007/0225049 A1* | 9/2007 | Andrada | H04M 1/6066 455/569.1 |
| 2008/0167868 A1* | 7/2008 | Kanevsky | G10L 15/20 704/233 |

(Continued)

FOREIGN PATENT DOCUMENTS

WO  2008123667 A1  10/2008

*Primary Examiner* — Mihir K Rayan
(74) *Attorney, Agent, or Firm* — McDonnell Boehnen Hulbert & Berghoff LLP

(57) ABSTRACT

Example embodiments include an example method that involves detecting, via a gesture-detection sensor of a head-mountable device (HMD), a first gesture in a buttonless-touch region. The buttonless-touch region is located behind an ear of a wearer of the HMD. The method also includes activating a voice interface responsive to detecting the first gesture and, while the voice interface is activated, receiving an audio input signal via a microphone. The method further includes detecting, via the gesture-detection sensor, a second gesture in the buttonless-touch region and, responsive to detecting the second gesture, deactivating the voice interface. The method still further includes processing the audio input signal to determine a voice command having a start-point corresponding to the detected first gesture and an end-point corresponding to the detected second gesture.

16 Claims, 11 Drawing Sheets

(56) References Cited

U.S. PATENT DOCUMENTS

| | | | |
|---|---|---|---|
| 2008/0252595 A1 | 10/2008 | Boillot | |
| 2008/0300016 A1 | 12/2008 | Nickel | |
| 2011/0074693 A1* | 3/2011 | Ranford | G01C 21/3608 |
| | | | 345/173 |
| 2011/0091059 A1* | 4/2011 | Sacha | H04R 25/50 |
| | | | 381/321 |
| 2011/0096036 A1 | 4/2011 | McIntosh et al. | |
| 2011/0234491 A1* | 9/2011 | Nurmi | G06F 3/041 |
| | | | 345/157 |
| 2012/0102399 A1* | 4/2012 | Nicholson | G06F 3/016 |
| | | | 715/702 |
| 2012/0215537 A1* | 8/2012 | Igarashi | G06F 3/167 |
| | | | 704/249 |
| 2013/0339859 A1* | 12/2013 | Hardi | G06F 3/016 |
| | | | 715/728 |
| 2014/0370855 A1* | 12/2014 | Koss | H04M 3/53366 |
| | | | 455/413 |
| 2015/0103021 A1 | 4/2015 | Lim et al. | |

* cited by examiner

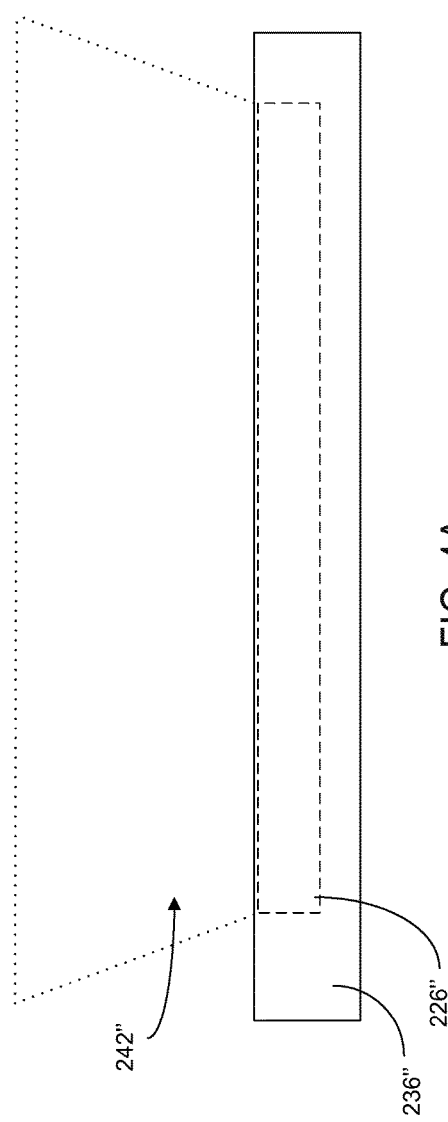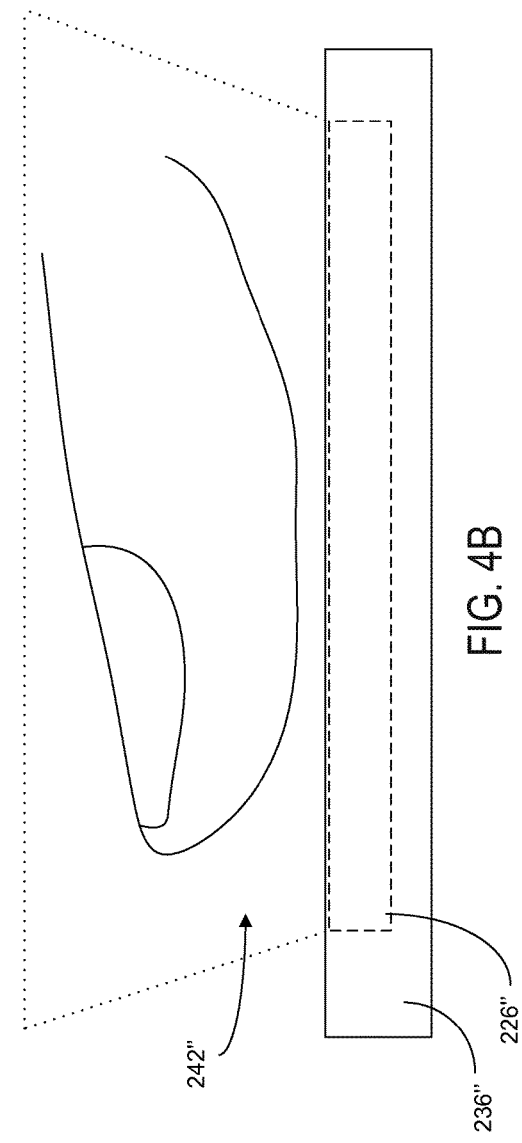

BEHIND THE EAR GESTURE CONTROL FOR A HEAD MOUNTABLE DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." A wearable computer device (WCD) that is capable of being worn on a user's head may be referred to as a "head mountable-device" (HMD) or "head-mounted device." HMDs may vary in size, taking a smaller form such as a glasses-style display, or a larger form such as a helmet, for example.

In some applications, wearable computing devices (WCD) may be operated by a voice command. Typically, the WCD listens for specific words (i.e., "hotwords" or "wake words"), which activate a voice interface when spoken by a user. Upon detecting the hotwords, the WCD notifies the user that the voice interface is activated and prompts the user to provide a voice command. The user then speaks the voice command, which the WCD receives via a microphone. When the WCD detects that the user is no longer speaking (e.g., by detecting a period of silence), the WCD deactivates the voice interface and processes the spoken words. Generally, the WCD may use speech recognition technologies (e.g., natural language processing) to process spoken words, convert them to a machine-readable format, and responsively carry out programmed actions.

SUMMARY

In one aspect, an example method involves detecting, via a gesture-detection sensor of a head-mountable device (HMD), a first gesture in a buttonless-touch region. The buttonless-touch region is located behind an ear of a wearer of the HMD. The method also includes activating a voice interface responsive to detecting the first gesture and, while the voice interface is activated, receiving an audio input signal via a microphone. The method further includes detecting, via the gesture-detection sensor, a second gesture in the buttonless-touch region and, responsive to detecting the second gesture, deactivating the voice interface. The method still further includes processing the audio input signal to determine a voice command having a start-point corresponding to the detected first gesture and an end-point corresponding to the detected second gesture.

In another aspect, an example HMD includes a microphone, a frame having an earpiece portion configured to be located behind an ear of a wearer when the HMD is worn by the wearer, and a gesture-detection sensor located in the earpiece portion. The gesture-detection sensor is configured to detect a first gesture and a second gesture in a buttonless-touch region behind the ear of the wearer. The HMD also includes a processor configured to: (i) activate a voice interface responsive to a first signal from the gesture-detection sensor indicating that the gesture-detection sensor detected the first gesture in the buttonless-touch region, (ii) receive an audio input signal from the microphone while the voice interface is activated, (iii) after the voice command is received, deactivate the voice interface responsive to a second signal from the gesture-detection sensor indicating that the gesture-detection sensor detected the second gesture in the buttonless-touch region, and (iv) determine a voice command based on the first signal, the second signal, and the audio input signal, the voice command having a start-point that corresponds to the detected first gesture and an end-point that corresponds to the detected second gesture.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 4A-4B illustrate a partial sectional view of an HMD and a buttonless-touch region according to an example embodiment.

DETAILED DESCRIPTION

Figure 1A:
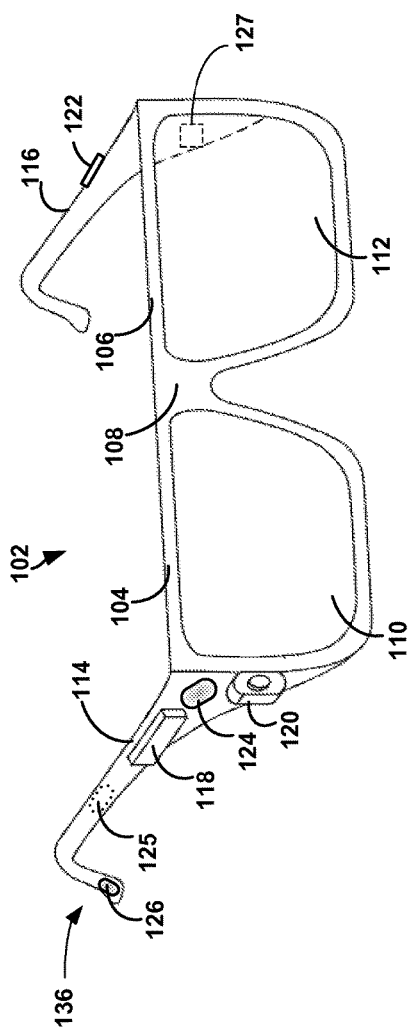
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

In the context of this disclosure, a "voice interface" provides a platform to initiate an automated service or process in response to a voice command spoken by the user. It should be understood that a "voice interface," as used herein, is different from a telephone interface employed to capture and transmit spoken words to another person during a telephone call.

As used herein, the phrases "activating a voice interface" and "deactivating a voice interface" mean taking actions that define a start-point of a voice command and taking actions that define an end-point of the voice command, respectively. Further, as used herein, the phrase "during activation" of the voice interface means occurring after the start-point and before the end-point. In some aspects, activating and deactivating the voice interface may include turning on a microphone and turning off a microphone, respectively. In additional or alternative aspects, activating and deactivating the voice interface may include computationally determining a portion of a captured audio signal to use as the voice command input to the voice interface. Other examples also may be possible.

I. OVERVIEW

Example embodiments of the present disclosure provide systems and methods that improve voice-based interactions between a user and a HMD. In some aspects, such improvements are achieved by systems and methods that facilitate controlling a voice interface by detecting predefined gestures behind a wearer's ear. In particular, the detected gestures may control activating and deactivating a voice interface and, thus, facilitate determining a start-point and an end-point of a voice command (which may also be referred to as a "voice input").

In one example, the wearer activates the voice interface by placing and holding a finger in a buttonless-touch region behind their ear, and the wearer deactivates the voice interface by removing the finger from the buttonless-touch region behind their ear. That is, the voice interface remains activated for as long as the HMD detects the presence of a finger in the buttonless-touch region. While the voice interface is activated, the wearer may speak a voice command into one or more microphones. The HMD then processes the voice command captured by the microphone(s) and responsively performs programmed actions based on the voice command.

In another example, the voice interface is activated when the wearer first taps the buttonless-touch region behind their ear and the voice interface is deactivated when the wearer next taps the buttonless-touch region behind their ear. Thus, in this example, the wearer is not required to hold a finger behind their ear the entire time the wearer speaks the voice command. Rather, the wearer only needs to engage the buttonless-touch region at the start and at the end of voice command.

In some examples, the HMD may include an earpiece portion that is located behind the wearer's ear when the HMD is worn on the wearer's head. The HMD may further include, in the earpiece portion, one or more sensors that detect gestures by the wearer in the buttonless-touch region. In some implementations, the buttonless-touch region may be located on a surface of the HMD. Thus, in such implementations, the sensor(s) may detect gestures by detecting physical contact between the wearer's finger and the HMD in the buttonless-touch region. In further implementations, the buttonless-touch region may additionally or alternatively include a volume of free space adjacent to the HMD. Thus, in these further implementations, the sensor(s) may additionally or alternatively detect a gesture behind the wearer's ear even if the wearer does not physically contact the HMD.

The voice interface of the present disclosure provides a number of advantages over existing voice interfaces in the context of an HMD. For example, as noted above, existing voice interfaces generally require the system to detect a transition between sound and silence to determine an end-point of a voice command. As a result, there is generally a delay period between the time the wearer stops speaking and the time the system recognizes that the wearer completed the command. In some instances, this delay period can range from several seconds to a minute or more, especially when the system is operated in an environment having non-negligible ambient noise (e.g., a restaurant, a train, etc.). During this time, the wearer is left waiting.

Detecting a transition between sound and silence to determine an end-point of a voice command may lead to other problems as well. For example, that approach tends to be error prone due to the system picking up ambient sounds after the wearer stopped speaking but before the system deactivates the voice interface. Further still, that approach may cause errors by deactivating the voice interface too soon if the wearer pauses while speaking the voice command.

Advantageously, such end-point problems are mitigated by the voice interface system of the present disclosure. This is, at least in part, because the system more immediately and accurately recognizes the end-point of the voice command responsive to a predefined gesture such as, for example, the wearer removing a finger from the buttonless-touch region or tapping the buttonless-touch region a second time.

Additionally, it has been found that using existing voice interfaces with an HMD may potentially cause confusion and misunderstandings in social contexts. For example, when an HMD employs a voice interface that is activated by hotwords and deactivated by silence detection, the entire process for providing a voice command is carried out solely by the wearer's speech. In social contexts, however, other people near the wearer may not realize that the wearer is speaking to the HMD and not to them. In some instances, people may think that the wearer is talking to oneself instead of the HMD. This may discourage a wearer from using the voice interface in social contexts. The voice interface of the present disclosure, however, overcomes such issues by using gestures that clearly signal to others around the wearer that the wearer is speaking to the HMD. By specifically detecting gestures behind the wearer's ear, such gestures may be conveniently and comfortably provided without impairing the wearer's vision.

II. EXAMPLE WEARABLE COMPUTING DEVICES

Systems and devices in which example embodiments may be implemented will now be described in greater detail. In general, an example system may be implemented in or may take the form of a head-mountable device (HMD). An HMD may generally be any wearable computer device (WCD) that is capable of being worn on the head and, thus, may take various forms such as a helmet, eyeglasses, or headphones. References to "eyeglasses" or a "glasses-style" HMD in the disclosure should be understood to refer to an HMD that has a glasses-like frame so that it can be worn on the head.

In some aspects, the HMD may be a display device that places a display in front of one or both eyes of the user when worn on the head. Example embodiments may be implemented by or in association with an HMD with a single display or with two displays, which may be referred to as a "monocular" HMD or a "binocular" HMD, respectively. Example HMDs that include a display device are illustrated and described below with respect to FIGS. 1A-1E. It should be understood that other HMDs having a display device are also possible.

In other aspects, the HMD may omit a display and instead have lenses that function in the same manner as lenses on traditional eyeglasses or sunglasses or, in still other aspects, the HMD may omit lenses as well. For instance, an HMD may serve primarily as a device to support voice interaction, so that the user can engage in voice command interactions using microphone(s), speaker(s), and an onboard computing system integrated in a glasses-style HMD. Such an HMD may be a dedicated voice interaction device, and thus may not include any type of camera or graphic display. Such an HMD could also tether to a user's mobile phone or other computing devices with displays, so that non-voice related feedback and input would be possible. Example HMDs that omit a display device is illustrated and described below with respect to FIGS. 1F-1I. It should be understood that other HMDs omitting a display device are also possible.

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

FIG. 1A illustrates a wearable computing system according to an example embodiment. In FIG. 1A, the wearable computing system takes the form of a head-mountable device (HMD) 102. It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

The HMD 102 may further include features that provide a voice interface for controlling operation of the HMD 102 based on words and phrases spoken by the wearer. To capture a wearer's speech, the HMD 102 may include one or more microphones. For instance, the microphone(s) can include a micro-electro mechanical system (MEMS) microphone, an electret microphone, a piezoelectric microphone, a contact microphone, a pressure microphone, and/or other types of microphone. In the illustrated example, the HMD 102 includes a microphone 127 located on an inner surface of the extending side arm 116. However, the microphone 127 may be positioned on other parts of the HMD 102 and/or the HMD 102 may include more than one microphone 127 in other examples. In some examples in which multiple microphones are included, the multiple microphones may capture the wearer's speech using beamforming techniques.

As noted above, the HMD 102 is configured to detect gestures behind the wearer's ear to facilitate activating and deactivating the voice interface. To do so, the HMD 102 includes a gesture-detection sensor 126 located on an earpiece portion 136 of the extending side arm 114. The earpiece portion 136 is configured to extend behind the wearer's ear when the HMD 102 is worn by the wearer. Thus, by locating the gesture-detection sensor 126 on the earpiece portion 136, the gesture-detection sensor 126 is also configured to be located behind the wearer's ear. It should be understood, however, that the gesture-detection sensor 126 can be located in other positions on the HMD 102 so long as the gesture-detection sensor 126 can detect gestures behind one of the wearer's ears. Additionally, it should be understood that the HMD 102 can include more than one gesture-detection sensor 126 in other examples.

The microphone 127 and the gesture-detection sensor 126 are communicatively coupled to the on-board computing system 118. For example, the on-board computing system 118 may receive from the microphone 127 an audio input signal indicative of spoken words captured by the microphone 127. Additionally, for example, the on-board computing system 118 may receive from the gesture-detection sensor 126 a gesture signal indicative of a gesture detected behind the wearer's ear.

Based on an audio input signal received from the microphone 127 and gesture signals received from the gesture-detection sensor 126, the on-board computing system 118 may determine a voice command received from the wearer. The on-board computing system 118 may then carry out one or more programmed actions based on the voice command. In this way, the on-board computing system 118, the gesture-detection sensor 126, and the microphone 127 may collectively provide a voice interface for operating the HMD 102. Additional details relating to the voice interface and the gesture-detection sensor 126 are described below in Section III.

In a further aspect, HMD 102 may be configured to receive user input in various ways, in addition or in the alternative to user input received via finger-operable touch pad 124 and/or the voice interface. For instance, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker 125 may function as a typical speaker, which vibrates the surrounding air to project sound from the speaker 125. In an additional or alternative example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure. In additional or alternative examples, BCT may be located behind the auricle, such that the BCT contacts the wearer on the back of the auricle. In such examples, BCT may vibrate the wearer's cartilage and/or bone structure.

Figure 1B:
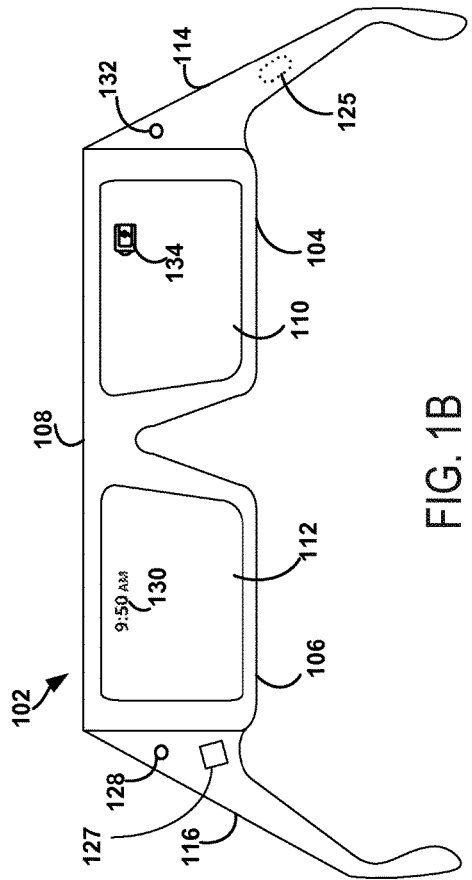
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
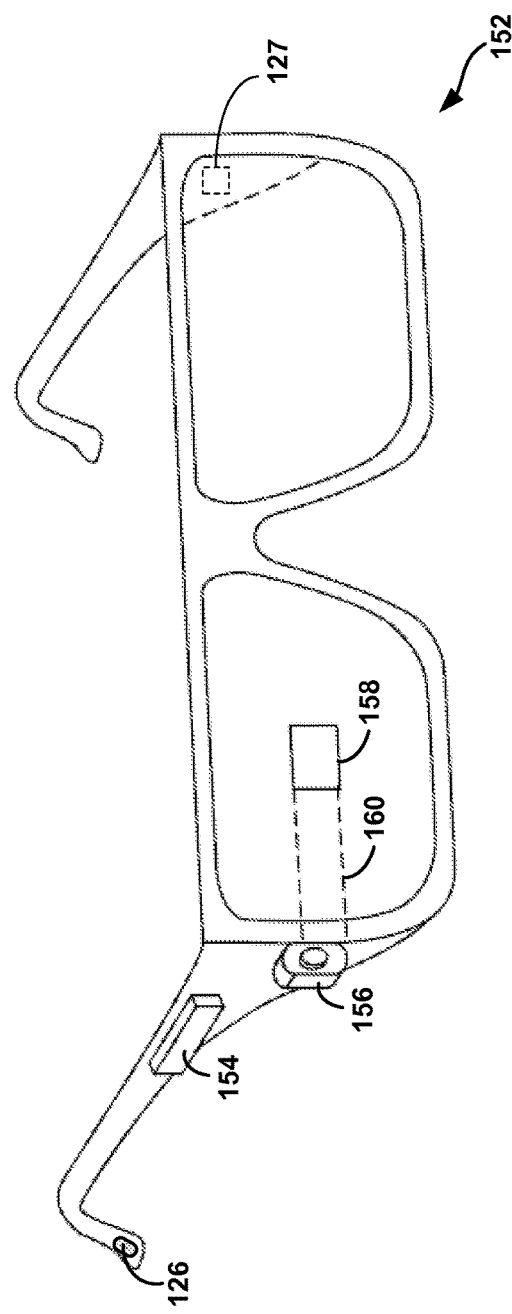
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

The HMD 152 may also include features that provide the voice interface functionalities described below. Accordingly, as shown in FIG. 1C, the HMD 152 may include a microphone 127 and a gesture-detection sensor 126. Although the HMD 152 includes one microphone 127 and one gesture-detection sensor 126, it should be understood that the HMD 152 can include more than one microphone 127 and/or more than one gesture-detection sensor 126 in other examples. Additionally, it should be understood that the microphone 127 and/or the gesture-detection sensor 126 may be positioned on parts of the HMD 152 other than those illustrated in FIG. 1C in other examples.

Figure 1D:
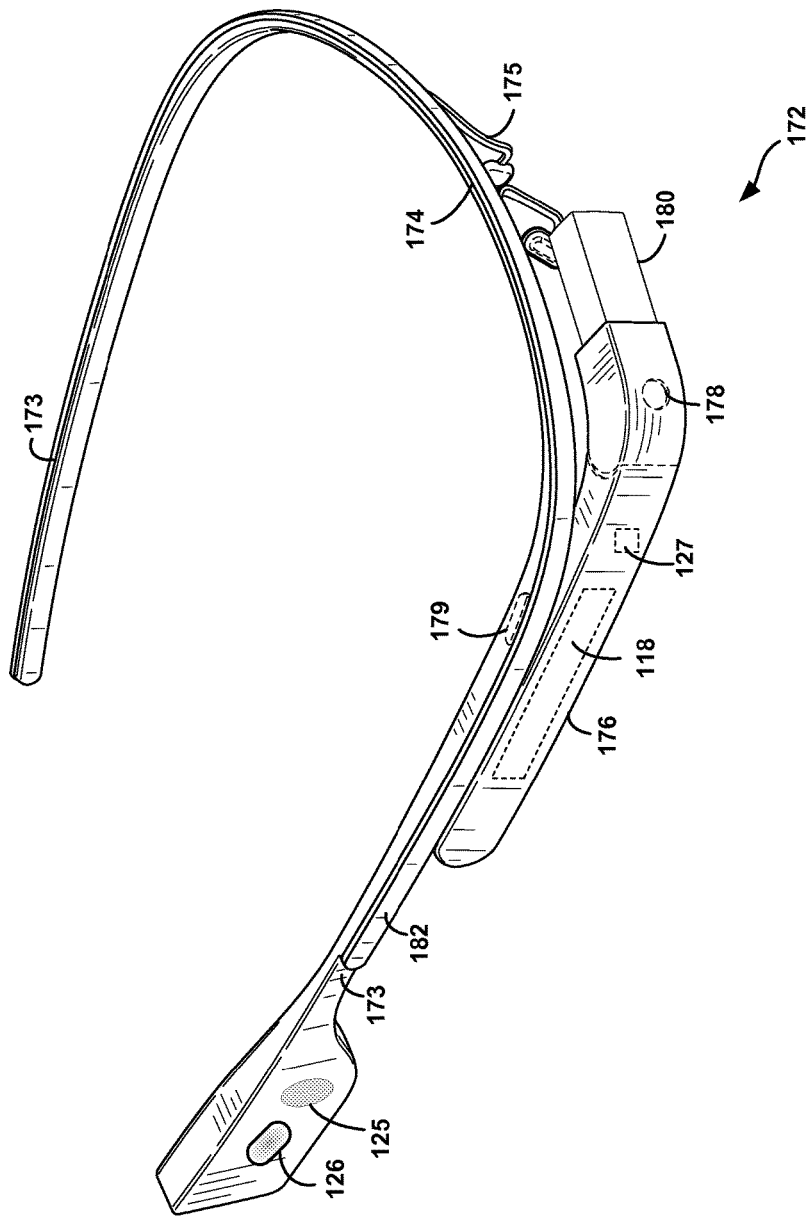
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 125.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 182, which may be used to adjust the length of the side-arms 173. Thus, sliding feature 182 may be used to adjust the fit of HMD 172. Further, an HMD may include other features that allow a wearer to adjust the fit of the HMD, without departing from the scope of the invention.

The HMD 172 may also include features that provide the voice interface functionalities described below. Accordingly, as shown in FIG. 1D, the HMD 172 may include a microphone 127 and a gesture-detection sensor 126. Although the HMD 172 includes one microphone 127 and one gesture-detection sensor 126, it should be understood that the HMD 172 can include more than one microphone 127 and/or more than one gesture-detection sensor 126 in other examples. Additionally, it should be understood that the microphone 127 and/or the gesture-detection sensor 126 may be positioned on parts of the HMD 172 other than those illustrated in FIG. 1D in other examples.

Figure 1E:
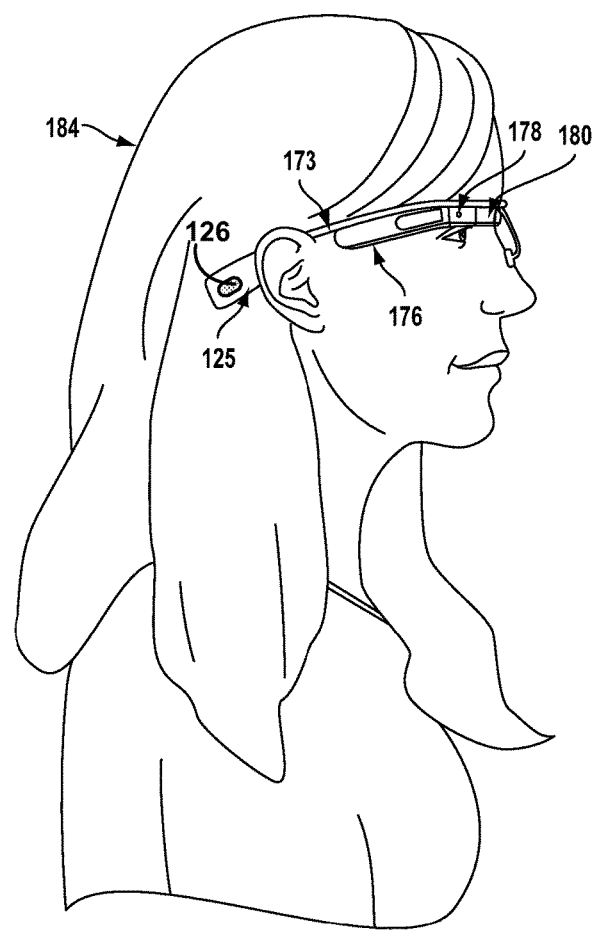
FIG. 1E is a simplified illustration of the wearable computing system shown in FIG. 1D, being worn by a wearer.

FIG. 1E is a simplified illustration of the HMD 172 shown in FIG. 1D, being worn by a wearer 190. As shown in FIG. 1E, BCT 125 is arranged such that when HMD 172 is worn, BCT 125 is located behind the wearer's ear. Also, as shown in FIG. 1E, the gesture-detection sensor 126 is located behind the wearer's ear when the HMD 172 is worn by the user. As such, the gesture-detection sensor 126 may detect gestures by the wearer behind the ear.

Figure 1F:
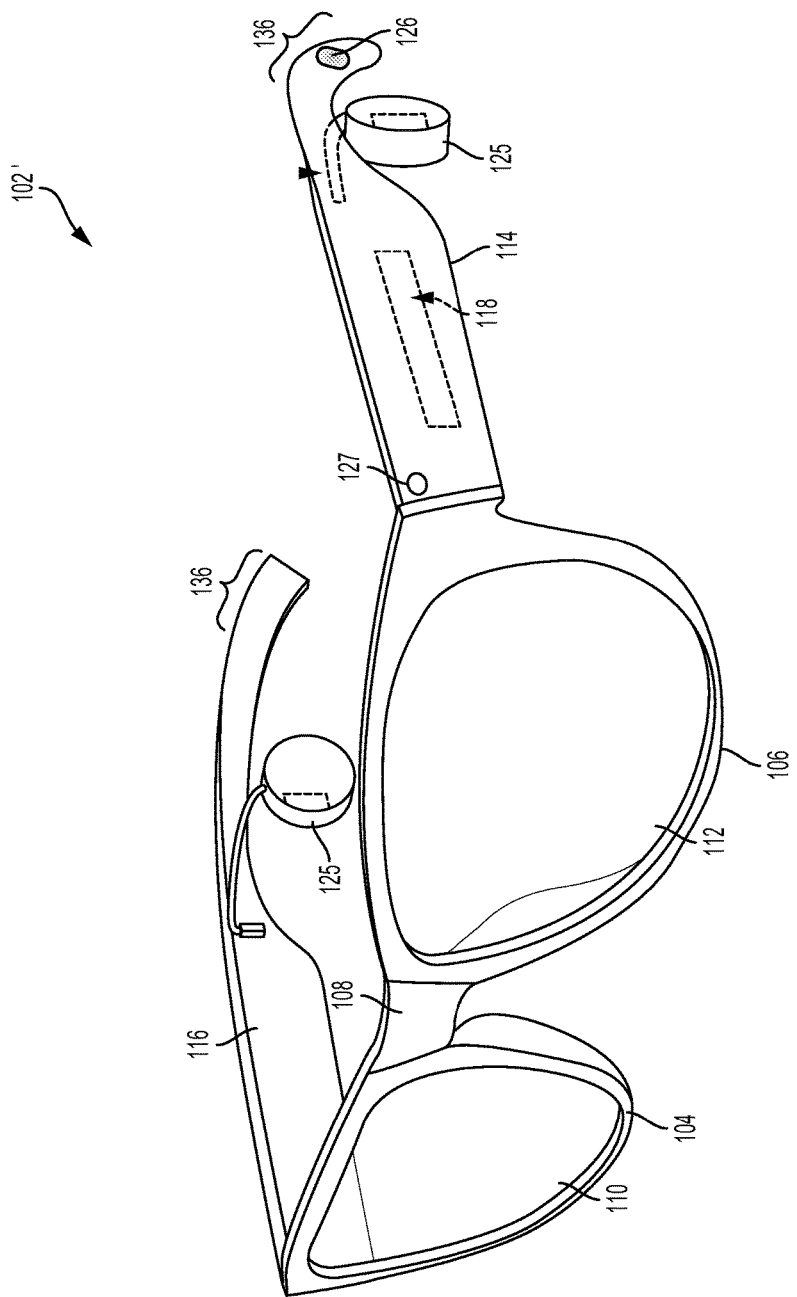
FIG. 1F illustrates yet another wearable computing system according to an example embodiment.

FIG. 1F illustrates another wearable computing system according to an example embodiment, which takes the form of an HMD 102'. The HMD 102' may include frame elements 104, 106, 108 and side-arms 114, 116 such as those described with respect to FIGS. 1A and 1B. The HMD 102' may additionally include an on-board computing system 118, a gesture-detection sensor 126, a microphone 127, and two speakers 125, such as those described with respect to FIGS. 1A and 1B. As such, the HMD 102' may include a voice interface for controlling operation of the HMD 102' and/or another device communicatively coupled to the HMD 102' (e.g., a mobile phone).

In the illustrated example, the HMD 102' omits a display device, an image capture device, and/or a finger-operable touch pad. Accordingly, the example HMD 102' illustrated in FIG. 1F may be employed primarily as a device supporting voice interaction. In some examples, the HMD 102' could also tether to a user's mobile phone or other computing devices with displays, so that non-voice related feedback and input may be possible. In other examples, the HMD 102' may include any other device described above (e.g., a display device, an image capture device, a finger-operable touch pad, a sensor, etc.).

Figure 1G:
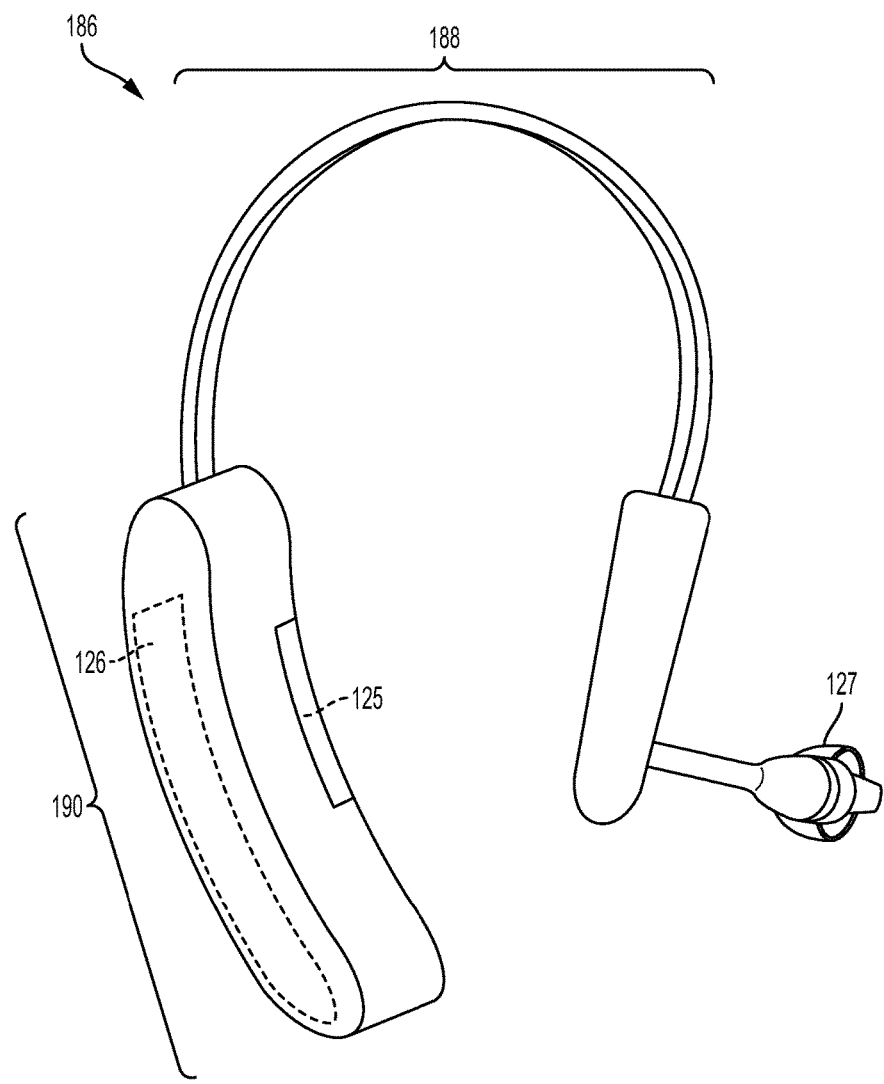
FIGS. 1G to 1I illustrate another wearable computing system according to an example embodiment.
Figure 1I:
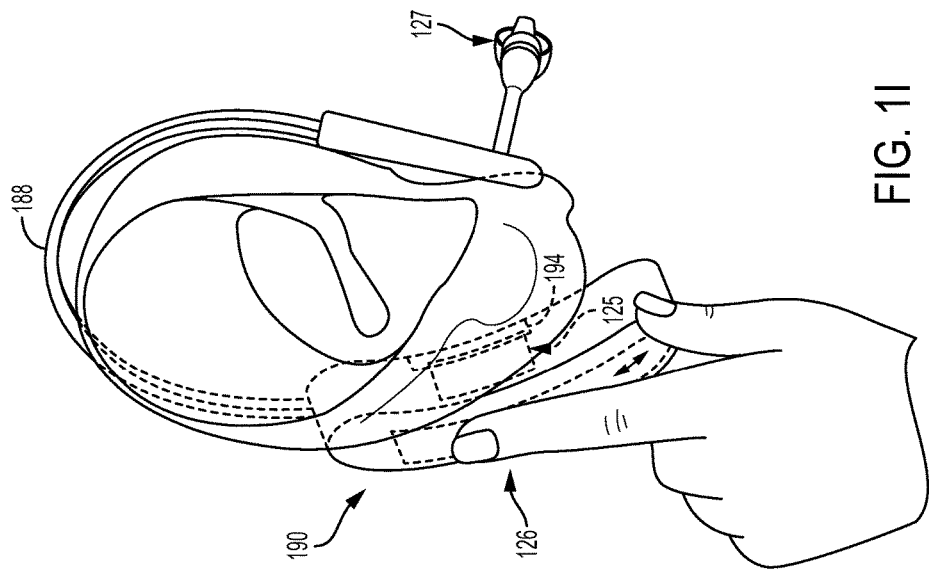
Figure 1H:
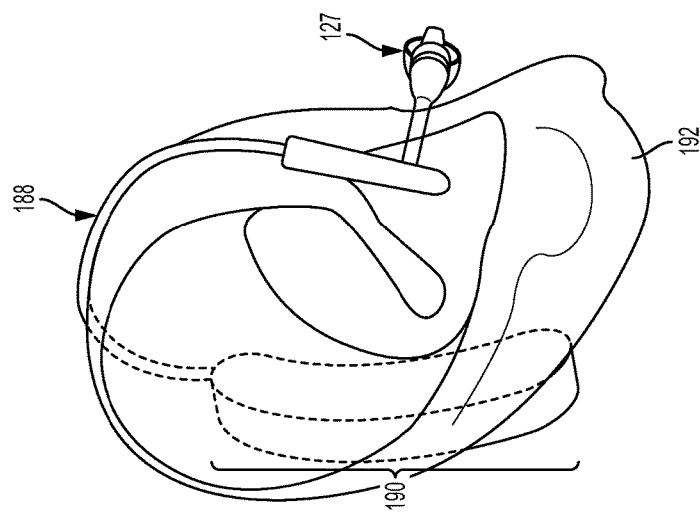

FIGS. 1G to 1I show yet another HMD according to an example embodiment. More specifically, FIGS. 1G to 1I shows an HMD 186, which includes a frame 188 and a behind-ear housing 190. As shown in FIG. 1H, the frame 188 is curved, and is shaped so as to hook over a wearer's ear 192. When hooked over the wearer's ear 192, the behind-ear housing 190 is located behind the wearer's ear 192. For example, in the illustrated configuration, the behind-ear housing 190 is located behind the auricle, such that a surface 194 of the behind-ear housing 190 contacts the wearer on the back of the auricle.

Note that the behind-ear housing 190 may be partially or completely hidden from view, when the wearer of HMD 186 is viewed from the side. As such, a HMD 186 may be worn more discreetly than other bulkier and/or more visible wearable computing devices.

Referring back to FIG. 1G, the behind-ear housing 190 may include a BCT 125, gesture-detection sensor 126, and a microphone 127. As such, the HMD 186 may include a voice interface for controlling operation of the HMD 186 and/or another device communicatively coupled to the HMD 186 (e.g., a mobile phone).

As shown in FIG. 1I, the BCT 125, may be arranged on or within the behind-ear housing 190 such that when the HMD 186 is worn, BCT 125 is positioned posterior to the wearer's ear, in order to vibrate the wearer's bone structure. More specifically, BCT 125 may form at least part of, or may be vibrationally coupled to the material that forms, surface 194 of behind-ear housing 190. Further, HMD 186 may be configured such that when the device is worn, surface 194 is pressed against or contacts the back of the wearer's ear. As such, BCT 125 may transfer vibrations to the wearer's bone structure via surface 194. Other arrangements of a BCT on an earpiece device are also possible.

As shown in FIG. 1I, the gesture-detection sensor 126 may arranged on a surface of the behind-ear housing 190 that curves around behind a wearer's ear (e.g., such that the gesture-detection sensor 126 generally faces towards the wearer's posterior when the HMD 186 is worn). Other arrangements are also possible.

The microphone 127 may be a directional microphone or an omni-directional microphone. Further, in some embodiments, an HMD 186 may include a microphone array and/or multiple microphones arranged at various locations on the HMD 186. Further, in some embodiments, the microphone 127 may be a removable component, which can be attached and detached from the HMD 186 by the user.

In the illustrated example, the HMD 186 omits a display device. Accordingly, the HMD 186 illustrated in FIGS. 1G-1I may be employed primarily as a device supporting voice interaction. In some examples, the HMD 186 could also tether to a user's mobile phone or other computing devices with displays, so that non-voice related feedback and input may be possible.

III. EXAMPLE HMD VOICE INTERFACE

As described above, each of the HMDs 102, 152, 172, 186, 102' illustrated in FIGS. 1A to 1I includes an on-board computing system 118, 154, a gesture-detection sensor 126, and a microphone 127, which collectively provide a voice interface. Additional aspects of the voice interface will now be described with reference to an example HMD 210 shown in FIG. 2. It should be understood that the concepts described with respect to the HMD 210 can be extended to any of the HMDs 102, 152, 172, 186, 102' described above and illustrated in FIGS. 1A to 1I.

Figure 2:
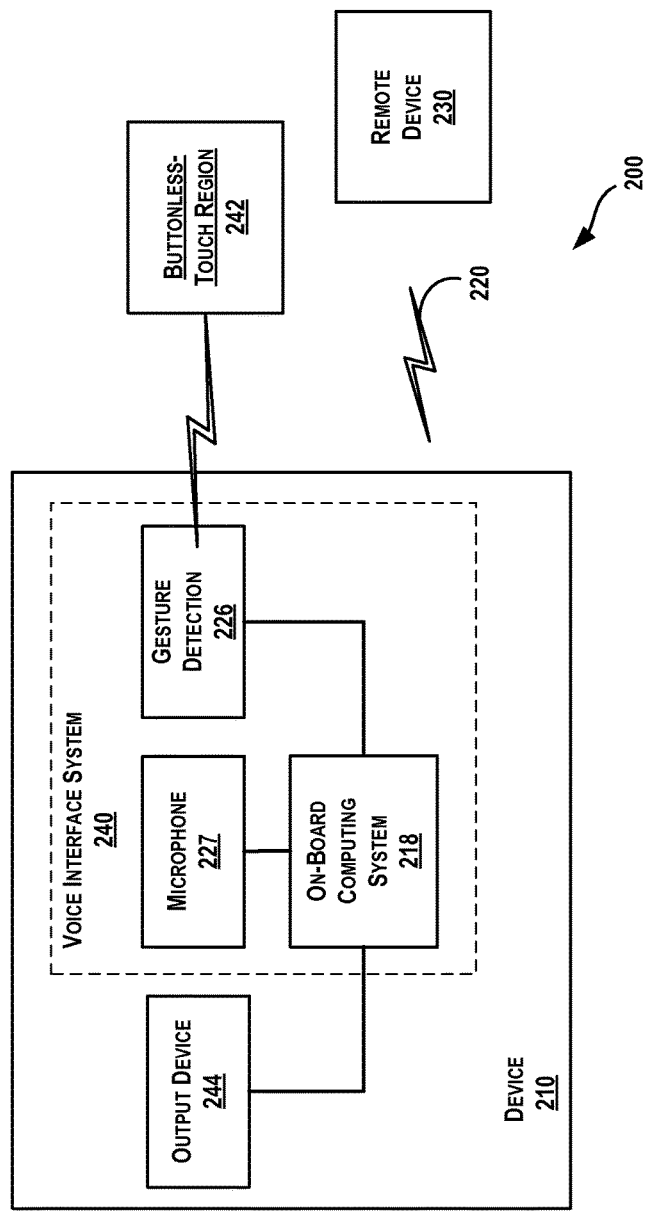
FIG. 2 is a simplified block diagram of a computing device according to an example embodiment.

FIG. 2 is a simplified block diagram of a HMD 210 according to an example embodiment. The HMD 210 may be any type of head-mountable device including, for example, the HMDs 102, 152, 172, 186, or 102' illustrated and described with respect to FIGS. 1A to 1I. Like the HMDs 102, 152, 172, 186, and 102' described above, the example HMD 210 shown in FIG. 2 includes an on-board computing system 218, a gesture-detection sensor 226, and a microphone 227, which provide a voice interface system 240 for the HMD 210.

Figure 3A:
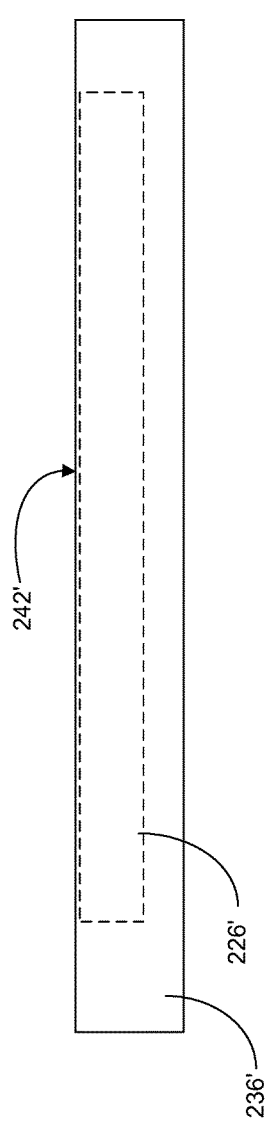
FIGS. 3A-3B illustrate a partial sectional view of an HMD and a buttonless-touch region according to an example embodiment.

In general, the gesture-detection sensor 226 is configured to detect gestures in a buttonless-touch region 242 behind the wearer's ear. In some aspects, the buttonless-touch region 242 may be located on an exterior surface of the HMD 210 (e.g., on a surface of the earpiece portion 136). The gesture-detection sensor 226 may thus detect gestures by sensing physical contact between the wearer's finger(s) and the HMD 210 in the buttonless-touch region 242. For example, the gesture-detection sensor 210 may include one or more touch sensors that are configured to sense at least one of a presence, a pressure, a position, and/or a movement of one or more fingers physically contacting the HMD 210 in the buttonless-touch region 242. The gesture-detection sensor 226 may sense such interactions between the finger(s) and the buttonless-touch region 242 via, for example, capacitive sensing, resistance sensing, optical sensing, or a surface acoustic wave process, among other possibilities. FIG. 3A illustrates an example gesture-detection sensor 226' providing a buttonless-touch region 242' on a surface of an earpiece portion 236' of the HMD 210.

In additional or alternative aspects, the buttonless-touch region 242 may extend from the surface of the HMD 210 into a volume of free space behind the wearer's ear (i.e., adjacent to the earpiece portion 136). The gesture-detection sensor 226 may thus detect gestures in the buttonless-touch region 242 without the wearer physically contacting the HMD 210. For example, the gesture-detection sensor 226 may include one or more proximity sensors that are configured to sense at least one of a presence, a distance, a position, and/or a movement of one or more fingers in the buttonless-touch region 242 via one or more transmissive type photoelectric sensors, direct reflective type photoelectric sensors, mirror reflective type photoelectric sensors, high-frequency oscillation proximity sensors, capacitance type proximity sensors, magnetic type proximity sensors, and/or infrared rays proximity sensors, among other possibilities. FIG. 4A illustrates an example gesture-detection sensor 210 providing a buttonless-touch region 242" in free space adjacent to an earpiece portion 236" of the HMD 210.

Figure 3B:
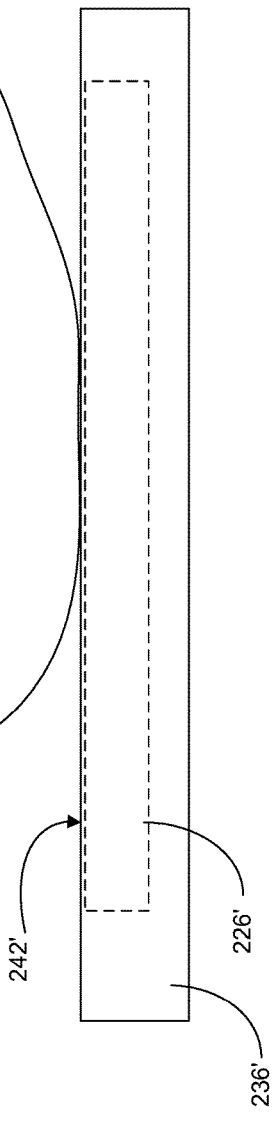

Accordingly, as described above, the gesture-detection sensor 226 may include one or more touch sensors and/or one or more proximity sensors. For ease of explanation, a "touch" of the buttonless-touch region may be considered to include a "contact touch" in which the wearer physically contacts the buttonless-touch region 242 on an exterior surface of the HMD 210 or a "proximity touch" in which the wearer places a finger in the buttonless-touch region 242 in free space without physically contacting the HMD 210. By way of example, FIG. 3B illustrates an example contact touch of the buttonless-touch region 242' shown in FIG. 3A, and FIG. 4B illustrates an example proximity touch of a buttonless-touch region 242" shown in FIG. 4A.

According to aspects of the disclosure, the gesture-detection sensor 226 may detect a first gesture, which activates the voice interface 240, and a second gesture, which deactivates the voice interface 240. In some examples, the first gesture may be different from the second gesture. For instance, in one example, the first gesture may be a touch and hold of a wearer's finger in the buttonless-touch region 242, while the second gesture may be, after holding the finger in the buttonless-touch region 242 for a period of time, removing the finger from the buttonless-touch region 242.

In other examples, the first gesture may be the same as the second gesture. For instance, in one example, the first gesture and the second gesture may be a tap of the wearer's finger in the buttonless-touch region 242. Each tap may be a touch in the buttonless-touch region 242 followed by a quick removal of the finger from the buttonless-touch region 242.

In still further examples, gestures may include various combinations of touches, movements, positions, and/or pressures detectable by the gesture-detection sensor 226 in the buttonless-touch region 242 according to aspects of the disclosure. In one implementation, a gesture may include a single touch and a movement of the wearer's finger within the buttonless-touch region 242. The movement may include a continuous, sliding motion in the buttonless-touch region (e.g., a swipe motion). In other implementations, a gesture may include multiple touches in the buttonless-touch region (e.g., a double-tap or a triple tap). In still other implementations, a gesture may include multiple fingers touching the buttonless-touch region (e.g., a one-finger touch may be a different gesture than a two-finger touch).

In practice, the gesture-detection sensor 226 may detect a gesture and responsively provide a gesture signal, indicative of the detected gesture, to the on-board computing system 118. The on-board computing system 118 may process the gesture signal to determine that a gesture occurred and responsively activate or deactivate the voice interface. In general, the on-board computing system 118 activates the voice interface by taking one or more actions that establish a start-point of a voice command and the on-board computing system 118 deactivates the voice interface by taking one or more actions that establish an end-point of a voice command.

In one example, the on-board computing system 118 may activate the voice interface by causing the microphone 127 to start capturing an audio input signal, which may include words spoken by the wearer. The on-board computing system 118 may deactivate the voice interface by causing the microphone 127 to cease capturing the audio input signal. Accordingly, the on-board computing system 118 may be configured to control operation of the microphone 127 in some aspects.

In the preceding example, the entire captured audio input signal may correspond to the voice command to be processed by the voice interface 240. Thus, in such examples, the start-point and end-point of the voice command correspond to the beginning and end, respectively, of the audio input signal. However, in other examples, a voice command may correspond to only a portion of a captured audio input signal. For instance, in some implementations, the microphone 227 may provide the audio input signal to the on-board computing system 218 prior to the activation and after deactivation of the voice interface 240 (i.e., in an "always-on" operational mode). In such implementations, the start-point and the end-point of the voice command may be determined, by the on-board computing system 228, to be the points of the captured audio input signal at which corresponding gestures were detected by the gesture-detection sensor 226. In other words, the on-board computing system 218 may use gesture signals received from the gesture-detections sensor 226 to determine the portion of the audio input signal that corresponds to the voice command.

In any event, the on-board computing system 228 determines a voice command based on the audio input signal received from the microphone 227 and the gesture signals received from the gesture-detection sensor 226. The voice command may be processed by the on-board computing system 228 into digital data. The processed digital data may be then utilized with a syntax (e.g., stored in a memory of the on-board computing system 218) that maps certain voice commands to certain programmed actions to be carried out by the HMD 210.

In some examples, the voice commands can cause the HMD 210 to initiate a phone call, select a radio station, play music from a storage device, send a text using speech-to-text, read a text message to the wearer via the speaker, enter an entry in a calendar, perform an internet search query, open an application, take a picture, record a video, set an alarm, set a timer, send an email, send a text message, request directions, etc.

In some examples, the voice command may cause the HMD 210 to responsively provide information to the wearer (e.g., the results of a search query or the contents of a received text message). To do so, the HMD 210 can optionally include an output device 244 to provide such information to the wearer. The output device 244 may include one or more speakers configured to auditory information to the wearer and/or one or more display devices configured to provide visual information to the wearer. As described above, the display may be, for example, an optical see-through display, an optical see-around display, or a video see-through display.

In some aspects, a voice command may be processed entirely by the on-board computing system 218. According to additional or alternative aspects, a voice command may be processed in whole or in part by a separate processor located on a remote device. For example, in FIG. 2, the HMD 210 optionally may be communicatively coupled, via a communication link 220 (e.g., a wired or wireless connection), to a remote device 230. The processor 218 may exchange data with the remote device 230 to carry out aspects of the voice interface 240 described above.

For example, the wearer may initiate a voice command using the HMD 210, the HMD 210 may transmit data for the voice command to the remote device 230, and the remote device 230 may carry out the actions specified by data for the voice command. The remote device 230 may then transmit information responsive to the voice command to the HMD 210 so that the HMD 210 can provide the information to the wearer, or the remote device 230 may itself provide the information to the wearer via, e.g., a display device or speaker. Other examples for distributed processing of voice commands are also possible.

The remote device 230 may be any type of computing device or transmitter including a laptop computer, a mobile telephone, tablet computing device, etc., that is configured to exchange data with the HMD 210. The remote device 230 and the HMD 210 may contain hardware to enable the communication link 220, such as processors, transmitters, receivers, antennas, etc.

Further, remote device 230 may take the form of or be implemented in a computing system that is in communication with and configured to perform functions on behalf of client device, such as HMD 210. Such a remote device 230 may receive data from the HMD 210 (e.g., an HMD 102, 152, 172, 102') or a mobile phone tethered to HMD 210, perform certain processing functions on behalf of the HMD 210, and then send the resulting data back to HMD 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

IV. EXAMPLE METHODS

Figure 5:
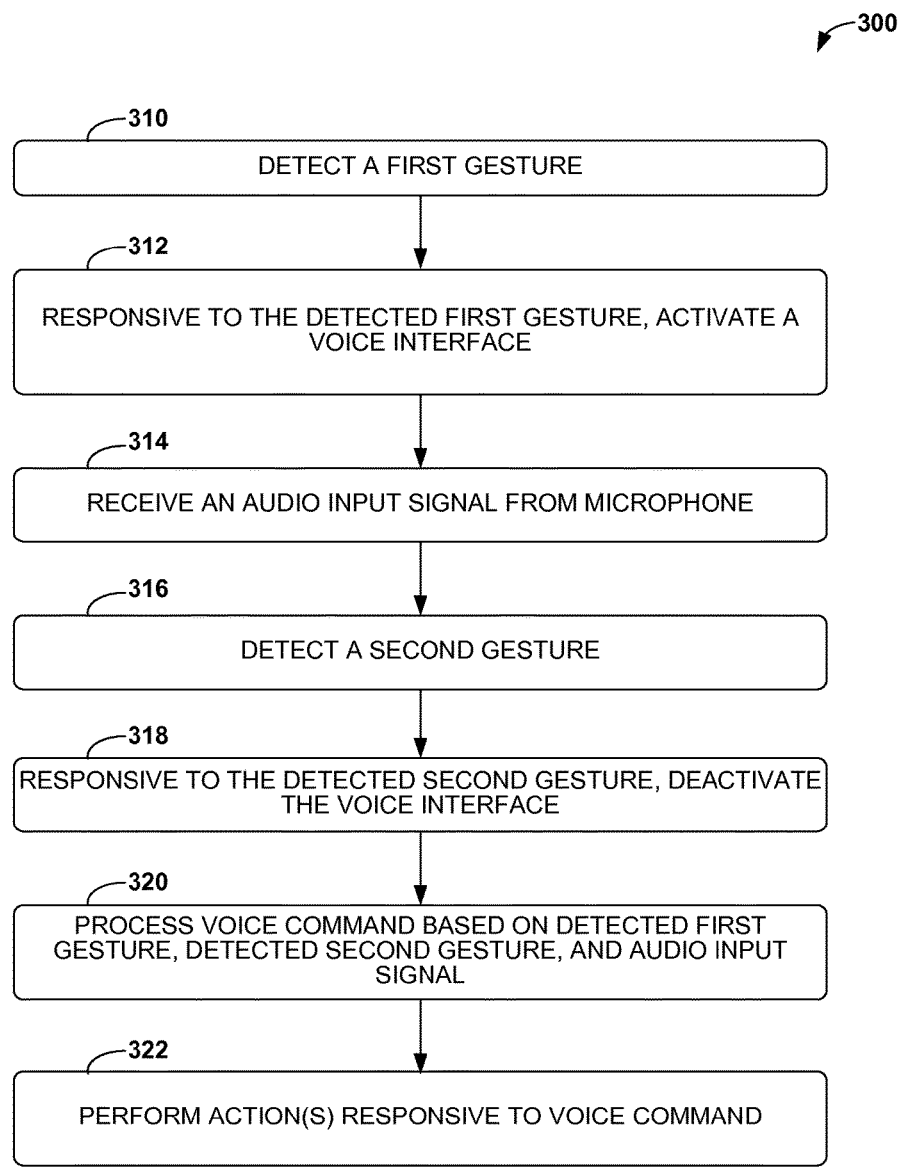
FIG. 5 is a flow chart illustrating a method for providing a voice interface, according to an exemplary embodiment.

FIG. 5 is a flow chart illustrating a method 300, according to an example embodiment. Exemplary methods, such as method 300, may be carried out in whole or in part by a wearable computing system including an HMD (e.g., by components and/or systems of an HMD). For explanatory purposes, the description below may simply refer to method 300 as being carried out by a computing system. However, it should be understood that method 300 or portions thereof may be carried out various types of devices including but not limited to an HMD, and may also be carried out by various combinations of an HMD and/or other computing devices (e.g., a tethered mobile device and/or a cloud server), without departing from the scope of the invention.

As shown by block 310, the method 300 involves a computing system detecting a first gesture in a buttonless-touch region. The buttonless-touch region may be provided by a gesture-detection sensor located behind the wearer's ear. As such, the computing system detects the first gesture in response to the user providing the first gesture behind the wearer's ear. In some aspects, the first gesture may be detected based on physical contact between the wearer and the HMD in the buttonless-touch region (i.e., a "contact touch"). In additional or alternative aspects, the first gesture may be detected without the wearer physically contacting the buttonless-touch region (i.e., a "proximity touch").

Responsive to the computing system detecting the first gesture, the computing system activates a voice interface at block 312. The computing system activates the voice interface by establishing a start-point for a voice command as described above. At block 314, while the voice interface is activated, the computing system receives an audio input signal via one or more microphones.

At block 316, the computing system detects a second gesture in the buttonless-touch region behind the wearer's ear. The second gesture may also be detected with and/or without physical contact between the wearer and the HMD in the buttonless-touch region. In some examples, the first gesture may be the same as the second gesture (e.g., a tap in the buttonless-touch region). In other examples, the first gesture and the second gesture may be different (e.g., the first gesture may include holding a finger in the buttonless-touch region and the second gesture may include removing the finger from the buttonless-touch region). Responsive to the computing system detecting the second gesture, the computing system deactivates the voice interface at block 318. The computing system deactivates the voice interface by establishing an end-point for the voice command as described above.

At block 320, the computing system processes the voice command to determine one or more actions to carry out responsive to the voice command. For example, the computing system may process the voice command, defined by the start-point and the end-point, to determine digital data corresponding to the voice command. The computing system may then process the digital data using a syntax that maps certain voice commands to certain programmed actions. At block 322, the computing system performs the one or more actions determined at block 320. Optionally, the one or more actions may include providing information to the wearer via an output device (e.g., a display device and/or a speaker).

It should be understood that while exemplary methods such as method 300 are described by way of example as being implemented by an HMD, an exemplary method may also be implemented in whole or in part by other types of computing devices. For example, an exemplary method may be implemented in whole or in part by a mobile phone, a tablet computer, a laptop or desktop computer equipped with a camera, and/or a network-enabled camera. Other examples of computing devices or combinations of computing devices that can implement an exemplary method are possible. In general, an exemplary method may be implemented by any computing device, system, or combinations of computing device(s) and/or system(s) that are configured to provide the same or similar functions as described herein.

As noted above, an exemplary method such as method 300 may also be carried out in whole or in part by a device or system, or by a combination of one or more devices and/or one or more systems, which are in communication with and can receive voice command data from a device or system that captures the voice command data (e.g., an HMD). For example, an exemplary method may be implemented in whole or in part by a server system, which receives voice command data from a device such as an HMD.

VI. EXAMPLE VARIATIONS

In the examples illustrated and described above, the gesture-detection sensor(s) 126 are configured to provide the buttonless-touch region behind the wearer's ear. It is contemplated, however, that the gesture-detection sensor(s) 126 may be configured to provide the buttonless-touch region above or in front of the wearer's ear (e.g., adjacent to the wearer's temple) according to some additional or alternative aspects.

Additionally, in the examples illustrated and described above, the HMDs include gesture-detection sensor(s) that provide a buttonless-touch region for detecting gestures. Such sensors provide a number of advantages over mechanical push buttons. For example, mechanical push buttons generally require the wearer to exert substantially more pressure on the HMD to achieve actuation than gesture-detection sensors that provide a buttonless-touch region. Indeed, depending on the sensitivity and type of sensor, a gesture-detection sensor may be actuated by a light contact or, in some instances, no physical contact with the HMD. Thus, while actuating a mechanical push button may cause the HMD to shift on the wearer's head, gesture-detection sensors providing a buttonless-touch region may have no such issues.

As another example, gesture-detection sensors may allow for greater HMD design flexibility than mechanical push buttons. For instance, mechanical push buttons generally take up greater amounts of space and require more rigidity than gesture-detection sensors.

Nonetheless, it is contemplated that the concepts of the disclosure may be extended to HMDs that include a mechanical push button, which may be actuated to control the voice interface. The button may be located, for example, on an earpiece portion of the HMD such that the wearer controls the voice interface by reaching behind their ear to actuate the button. In one example, actuating the button a first time may activate the voice interface and actuating the button a second time may deactivate the voice interface. In another example, the wearer may push and hold the button to activate the voice interface and the wearer may release the button to deactivate the voice interface.

In the examples described above, the voice interface of the HMD may be controlled based on two gestures—a first gesture that activates the voice interface and a second gesture that deactivates the voice interface. However, it is contemplated that the voice interface may be controlled based on more than two gestures according to additional or alternative aspects of the disclosure. For example, the voice interface may be operable to detect an additional gesture that causes the voice interface to cancel a voice command provided to the voice interface. As another example, the voice interface may be operable to detect an additional gesture that causes the voice interface to repeat information provided to the wearer (e.g., via an output device) in response to a voice command.

To distinguish among multiple different gestures, a computing system (e.g., the on-board computing system and/or a remote device) may store one or more gesture profiles in memory. The computing system may also determine a profile from gesture signals received from the gesture-detection sensor(s) and compare the determined profile to the stored profiles. Based on the comparison, the computing system may determine which one of multiple potential gestures was provided by the wearer in a buttonless-touch region. Responsive to determining the gesture provided by the wearer, the computing system may carry out an action for the voice interface such as, for example, activating the voice interface, deactivating the voice interface, canceling a prior voice command, and/or repeating an output for a voice command, among other possibilities.

VI. CONCLUSION

The above detailed description describes various features and functions of the disclosed systems, devices, and methods with reference to the accompanying figures.

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a computing system. Such a computing system may include various computing devices or components thereof, such as a processor or microprocessor for implementing specific logical functions or actions in the method or technique.

The program code and/or related data may be stored on any type of computer-readable medium, including non-transitory computer-readable media such as a storage device, including a disk drive, a hard drive, or other storage media. The computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A head-mountable device (HMD) comprising:
a microphone;
a frame having an earpiece portion configured to be located proximate an ear of a wearer when the HMD is worn;
a gesture-detection sensor located in the earpiece portion, wherein the gesture-detection sensor is configured to detect a first gesture and a second gesture in a buttonless-touch region located posterior to the ear of the wearer; and
a processor configured to:
activate a voice interface responsive to a first signal from the gesture-detection sensor indicating that the gesture-detection sensor detected the first gesture in the buttonless-touch region located posterior to the ear, receive an audio input signal from the microphone while the voice interface is activated, after the first signal is received, deactivate the voice interface responsive to a second signal from the gesture-detection sensor indicating that the gesture-detection sensor detected the second gesture in the buttonless-touch region located posterior to the ear, and determine a voice command based on the first signal, the second signal, and the audio input signal, the voice command having a start-point that corresponds to the detected first gesture and an end-point that corresponds to the detected second gesture, wherein the first signal indicates that a finger is positioned and held in the buttonless-touch region to the posterior to the ear and the second signal indicates that the finger is removed from the buttonless-touch region to the posterior to the ear.

2. The HMD of claim 1, wherein the gesture-detection sensor is configured to detect physical contact between the wearer and an exterior surface of the earpiece portion, wherein the buttonless-touch region is provided on the exterior surface.

3. The HMD of claim 1, wherein the gesture-detection sensor is configured to detect the first gesture and the second gesture in a volume of free space adjacent to the earpiece portion, wherein the buttonless-touch region is provided in the volume of free space.

4. The HMD of claim 1, wherein the frame is in the form of eyeglasses.

5. The HMD of claim 1, wherein the processor is further configured to:

determine, using a syntax stored in memory, a programmed action corresponding to the voice command; and perform the programmed action.

6. The HMD of claim 1, wherein the processor is further configured to:

determine data related to the voice command; and transmit the data to a remote device to cause the remote device to carry out a programmed action corresponding to the voice command.

7. The HMD of claim 1 further comprising a display device, wherein the processor is further configured to cause the display device to display information responsive to the voice command.

8. The HMD of claim 1, wherein the processor is further configured to control operation of the microphone responsive to the first signal and the second signal.

9. A method comprising:

detecting, via a gesture-detection sensor of a head-mountable device (HMD), a first gesture in a buttonless-touch region of the HMD, wherein the buttonless-touch region is located posterior to an ear of a wearer when the HMD is worn;

responsive to detecting the first gesture in the buttonless-touch region located posterior to the ear, activating a voice interface;

while the voice interface is activated, receiving an audio input signal via a microphone;

detecting, via the gesture-detection sensor, a second gesture in the buttonless-touch region located posterior to the ear;

responsive to detecting the second gesture, deactivating the voice interface; and processing the audio input signal to determine a voice command provided while the voice interface was activated, wherein detecting the first gesture includes detecting a finger touched and held in the buttonless-touch region to the posterior of the ear, and wherein the detecting the second gesture includes detecting the finger removed from the buttonless-touch region to the posterior of the ear.

10. The method of claim 9, further comprising performing a programmed action corresponding to the voice command.

11. The method of claim 10, wherein the HMD includes an output device configured to provide at least one of an audio output or a visual output to the wearer of the HMD, and the performing the programmed action comprises providing information, responsive to the voice command, to the wearer via the output device.

12. The method of claim 10, further comprising:

determining, via the HMD, data corresponding to the voice command; and transmitting the data from the HMD to a remote device, wherein the remote device performs the programmed action.

13. The method of claim 9, wherein the activating the voice interface comprises starting to capture the audio input signal via the microphone and the deactivating the voice interface comprises ceasing to capture the audio input signal via the microphone.

14. The method of claim 9, further comprising determining, using a syntax stored in a memory, the programmed action corresponding to the voice command.

15. The method of claim 9, further comprising providing the buttonless-touch region on an exterior surface of the HMD.

16. The method of claim 9, further comprising providing the buttonless-touch region in a volume of free space adjacent to the HMD.

* * * * *